No. 749,831. PATENTED JAN. 19, 1904.
S. C. ANDERSON.
CORN HARVESTER.
APPLICATION FILED DEC. 1, 1902.
NO MODEL. 5 SHEETS—SHEET 3.
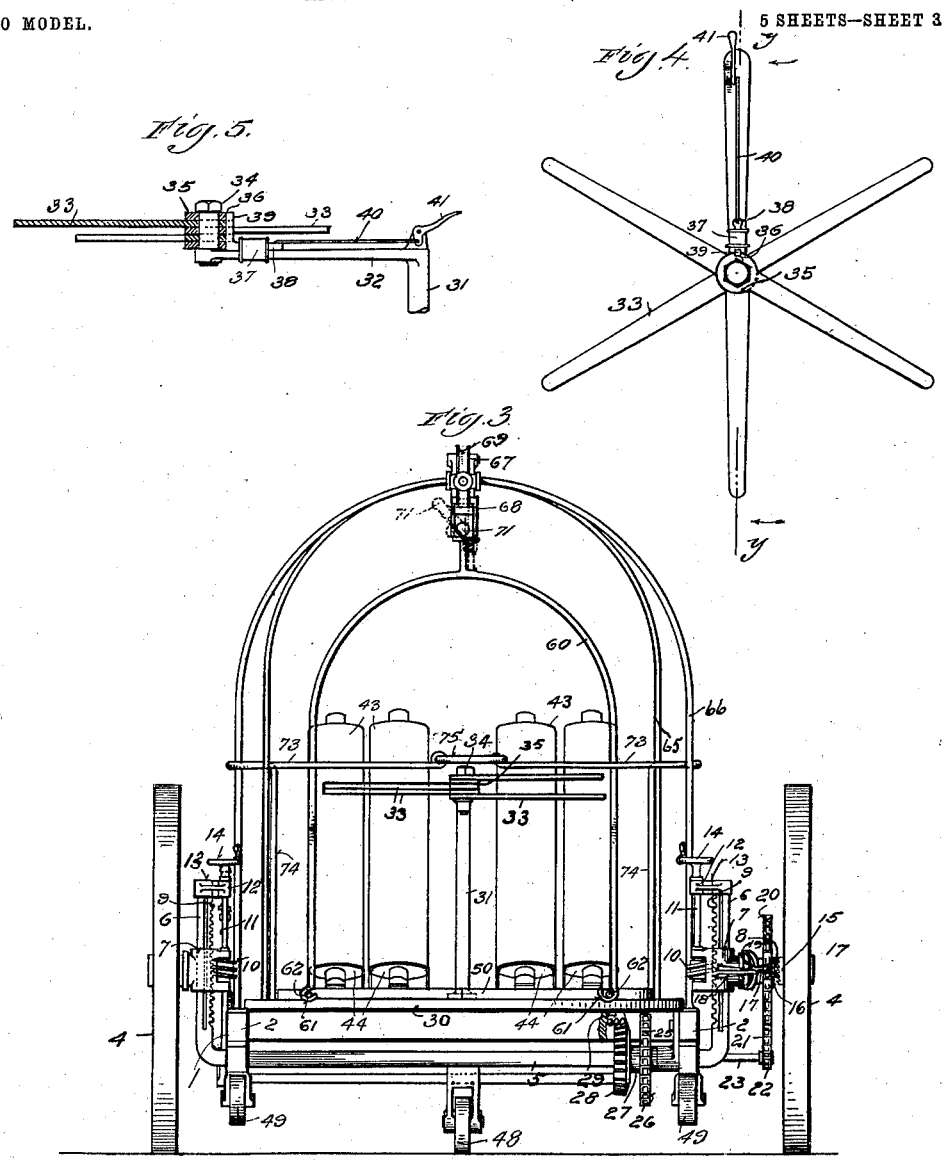
WITNESSES: INVENTOR.
Samuel C. Anderson
BY
ATTORNEY.

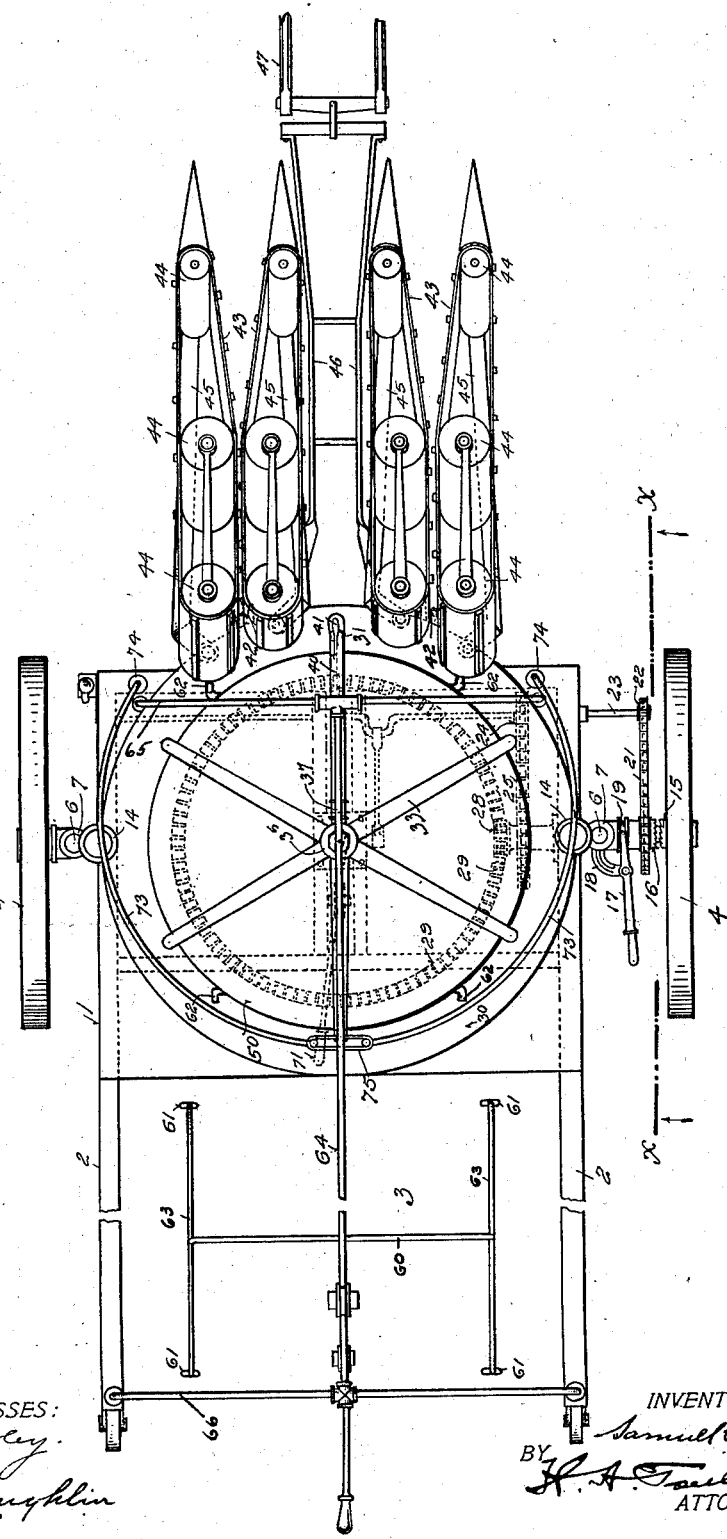

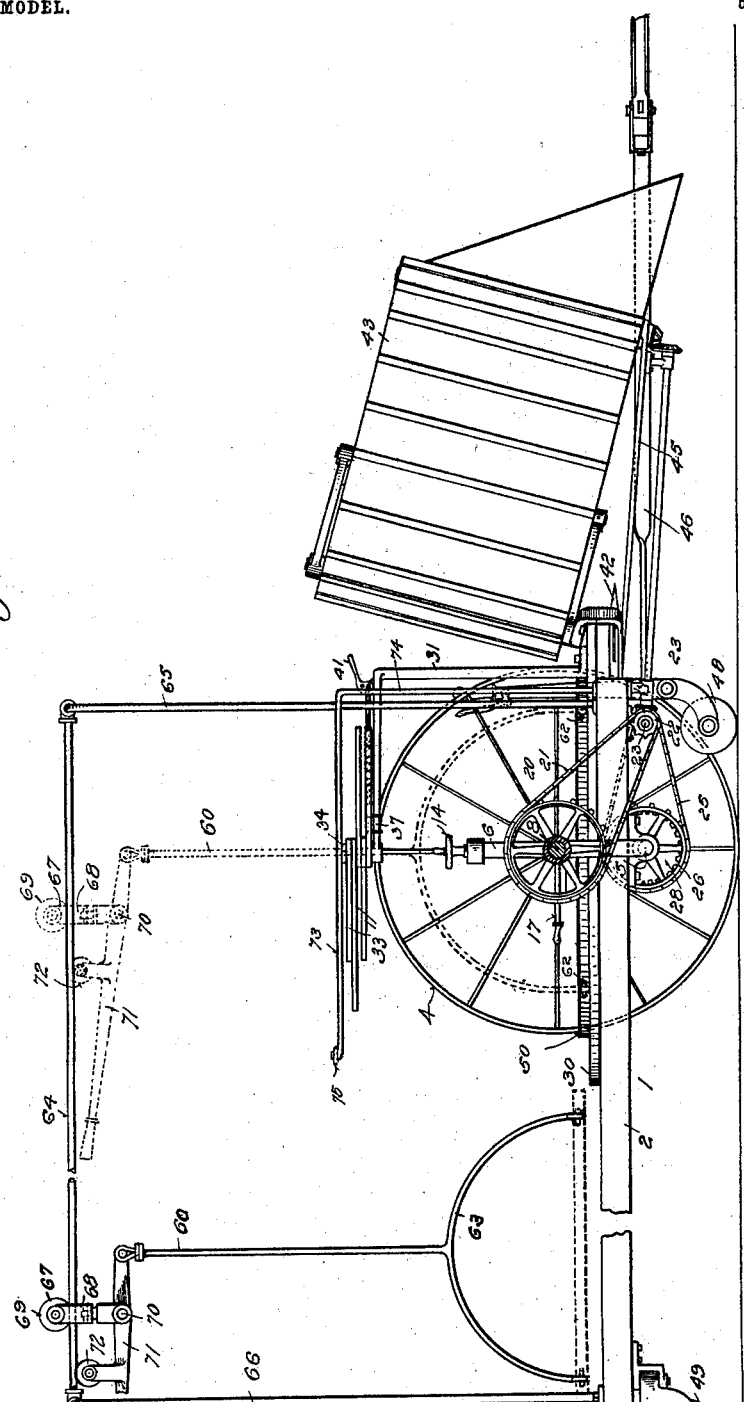

No. 749,831. PATENTED JAN. 19, 1904.
S. C. ANDERSON.
CORN HARVESTER.
APPLICATION FILED DEC. 1, 1902.
NO MODEL. 5 SHEETS—SHEET 4.
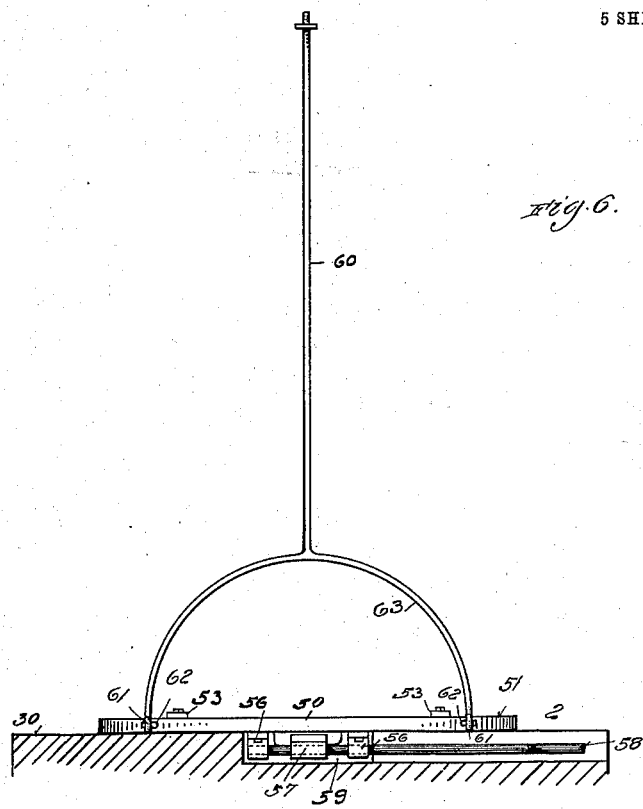
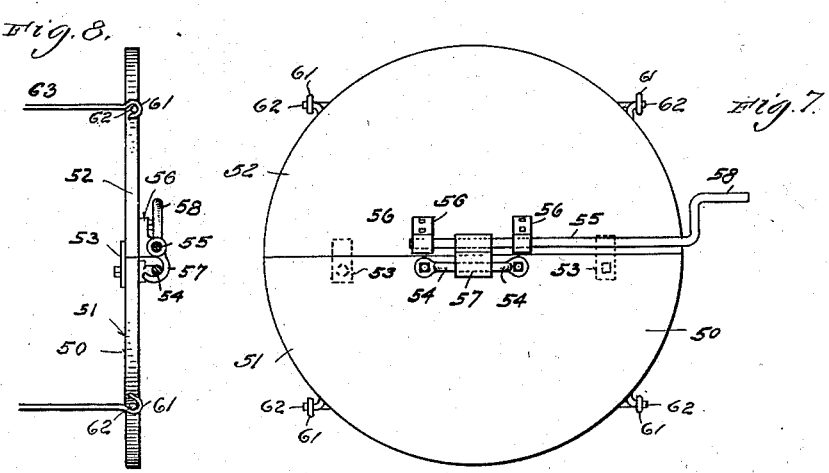
WITNESSES:
J. C. Dawley
Will O'Laughlin
INVENTOR.
Samuel C. Anderson
BY H. H. Fontaine,
ATTORNEY.

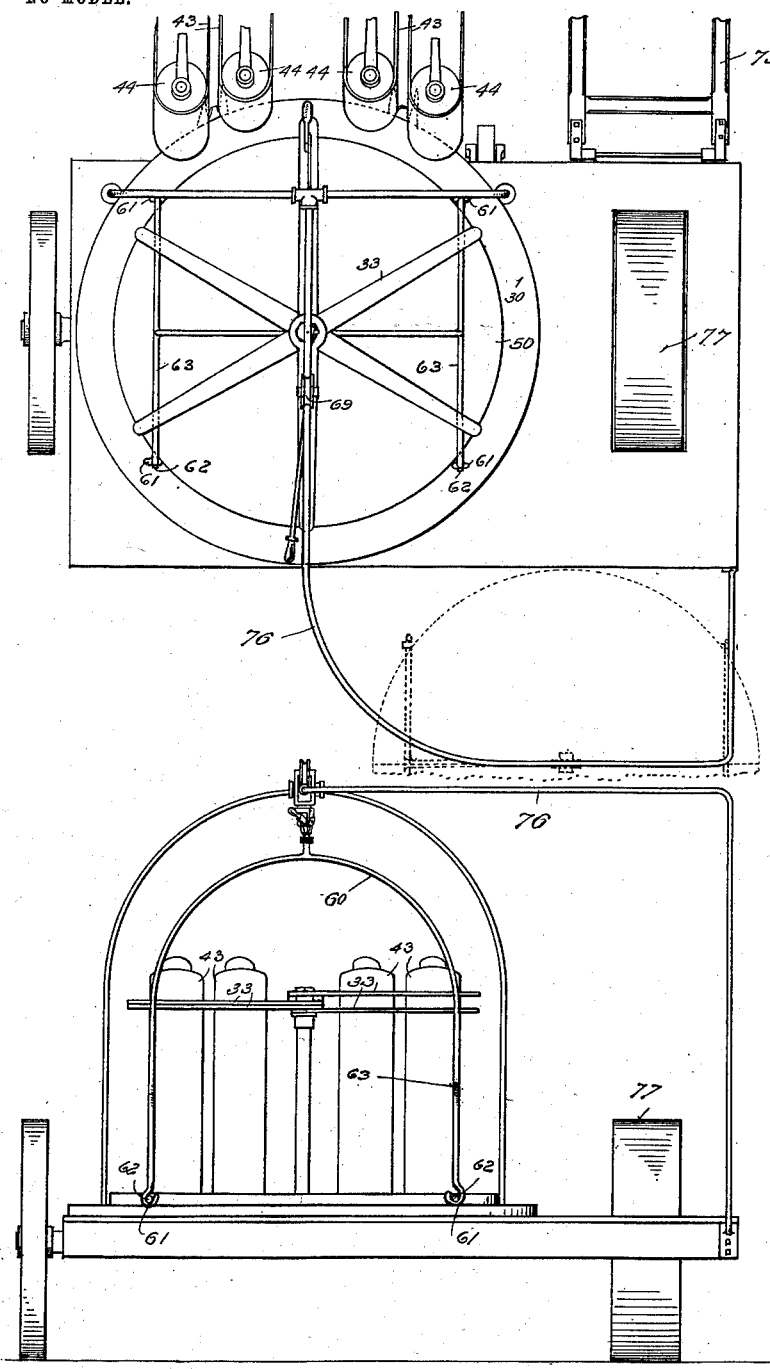

No. 749,831. Patented January 19, 1904.

UNITED STATES PATENT OFFICE.

SAMUEL C. ANDERSON, OF XENIA, OHIO.

CORN-HARVESTER.

SPECIFICATION forming part of Letters Patent No. 749,831, dated January 19, 1904.

Application filed December 1, 1902. Serial No. 133,325. (No model.)

*To all whom it may concern:*

Be it known that I, SAMUEL C. ANDERSON, a citizen of the United States, residing at Xenia, in the county of Greene and State of Ohio, have invented certain new and useful Improvements in Corn-Harvesters, of which the following is a specification, reference being had therein to the accompanying drawings.

This invention relates to corn-harvesters, and has for its object to provide mechanism whereby the standing corn may be cut, conveyed to a suitable shocking-platform, whereon the accumulating stalks are formed into a shock, and the shock thus formed may be lifted from the shocking-platform and carried thence and delivered on the ground.

The present invention relates more particularly to the means whereby the shock after it has been formed upon the shocking-platform is lifted therefrom and conveyed to the point of delivery.

The invention consists in certain novel features, which will be hereinafter described, and then particularly pointed out in the claims.

In the accompanying drawings, Figure 1 is a plan view of a machine embodying my invention in one form. Fig. 2 is a sectional elevation taken on the line $x$ $x$ of Fig. 1 and looking in the direction of the arrows. Fig. 3 is a rear elevation. Fig. 4 is a detail plan view of the gathering-arms. Fig. 5 is a detail sectional view taken on the line $y$ $y$ of Fig. 4 and looking in the direction of the arrows. Fig. 6 is a detail view in elevation of the movable shock-support and its supporting-yoke detached. Fig. 7 is a bottom plan view of the same. Fig. 8 is a detail view in elevation at right angles to Fig. 6, the same being partly in section. Fig. 9 is a plan view of a modified form of the invention, and Fig. 10 is a rear elevation of the same.

In the said drawings, 1 indicates the main frame, which may be rectangular in form, as shown, the side members or sills 2 extending some distance to the rear and having between them an open space 3, which is free or unobstructed at the rear end, except for the track-supporting arch hereinafter referred to. The frame is supported upon wheels 4, located one at each side of the forward part of said frame, these wheels being preferably vertically adjustable, so as to vary the distance of the frame from the ground. To this end I provide an axle 5, passing under the frame and having its ends extending vertically upward, as indicated at 6, to form vertical guides for the sleeves 7, which carry the spindles 8, on which the wheels 4 are mounted. Each guide 6 is provided with a rack 9, with which meshes a worm 10 on a vertical shaft 11, mounted in suitable bearings on the sleeve 7, said shaft extending through and sliding in a bearing 12, carried by a bracket 13, secured to the upper end of the guide 6. Each shaft 11 is provided at its upper end with an operating hand-wheel 14. By this means the frame may be readily raised or lowered, as desired. One of the driving-wheels 4 is provided with a clutch member 15, and there is mounted loosely on the spindle 8, so as to slide thereon, a corresponding clutch member 16, operated by a lever 17, carried by a bracket 18, extending from the sleeve 7. This lever engages a groove 19 in the clutch member 16, so that it may be engaged with or disengaged from the clutch member 15. The clutch member 16 carries a sprocket-wheel 20, which by means of a sprocket-chain 21 drives a sprocket-wheel 22 on a counter-shaft 23, located at the front of the frame 1 below said frame. A similar driving connection may be made with said counter-shaft from both of the ground-wheels 4, if desired. The counter-shaft 23 is provided with a second sprocket-wheel 24, (shown in dotted lines in Fig. 1,) which by means of a sprocket-chain 25 drives a sprocket-wheel 26 on a sleeve 27, mounted on the body 5 of the axle. This sleeve 27 also carries a bevel-gear 28, which meshes with a bevel-gear 29, secured on the under side of a rotary shocking-platform 30, carried on the forward part of the main frame 1. In connection with this rotary shocking-platform, which may be driven from the ground-wheel or ground-wheels in any suitable manner, I employ suitable stalk-supporting arms, and I prefer for this purpose the construction shown, in which a standard 31 is located on the rotary platform near the margin thereof and extends above the same to a suitable height, being provided at its upper end with a horizontal arm 32, which extends over the platform 30 to the center thereof. There are pivotally mounted on the free end of this arm a plurality of radial arms 33, which are held in their normal radial position by means of a suitable locking mechanism, but which when released are free to swing. The construction which I prefer for that purpose is that shown, in which the arm 32 is provided with a pivot pin or bolt 34, on which the arms 33 are pivotally mounted one above the other. Each arm 33 has a circular hub 35, provided with a notch 36, and there is mounted on the arm 32 a keeper 37, in which slides a locking-bolt 38, having an upright finger 39, which normally engages the notches 36 and holds the arms 33 stationary with respect to the arm 32, so that they diverge from each other and from said arm at about equal angles, as shown, and rotate along with the platform 30. The bolt 38 is operated by a rod 40 and hand-lever 41 or by any other suitable operating mechanism.

At the front of the machine is located a suitable cutting mechanism 42, driven in any suitable way from the counter-shaft 23, and in connection with this cutting mechanism I employ stalk gathering and conveying mechanism consisting, essentially, of two pairs of rearwardly-traveling aprons 43, inclined rearward and upward, having their adjacent faces in vertical planes and adapted to grasp the stalks between them, said aprons extending from a point forward of the cutters, upward and rearward past the cutters, and over and beyond the front or receiving edge of the rotary platform. These aprons are supported by rollers 44, some of which are driven in any suitable manner from the counter-shaft 23 and are supported on arms 45, extending forward of the frame. A draft-tongue 46, pivoted to the front of the frame, receives a suitable draft connection 47 at the extreme front of the machine. The frame 1 is provided at its forward end with a swiveling caster-wheel 48, and at its rear end, at the rear extremity of each longitudinal member 2, a similar swiveling caster-wheel 49 is provided.

The rotary shocking-platform 30 is preferably circular in form and receives a movable shock-support 50, which is adapted to rest thereon during the formation of the shock. This shock-support is also preferably circular in form and of somewhat less diameter than the shocking-platform on which it rests and along with which it rotates. The shock-support 50 is preferably constructed in two sections 51 and 52, one of which is provided with lugs 53 on its upper side, which extend over the adjacent margin of the part 51, the line of division being diametrical. This member 52 is provided on its under side with a loop or cross-bar 54, and the other member 51 is provided with a rock-shaft 55, mounted in bearings 56 on its under side and carrying a hook-shaped projection 57, adapted to engage the loop or cross-bar 54. The rock-shaft 55 extends to the margin of the support and is there provided with an operating-handle 58. The rotary platform 30 is provided with a recess 59, in which the mechanism on the under side of the shock-support fits, so that the shock-support may lie snugly upon the rotary platform, and this engagement of the mechanism with said recess serves to prevent displacement of the support while the shock is forming. Any other suitable means to this end may be employed, however.

In connection with the shock-support 50 I employ a supporting-yoke 60, adapted to be engaged with or disengaged therefrom and having an arch-like form of sufficient height and width to straddle the shock. Preferably the shock-support 50 is provided with pins 62, with which engage terminal hooks 61 on the lower ends of the yoke 60, and said yoke is preferably formed at each of its lower ends into a second yoke 63 or is, in other words, bifurcated at each of its lower ends to have two points of connection on each side with the shock-support 50. Any other suitable pivotal and detachable connection between the shock-support and the yoke 60 may be employed instead of the hook-and-pin connection shown.

The frame 1 supports an overhead track or way 64, extending from a point above the shocking-platform to the point of discharge of the shock. In the construction shown in Figs. 1, 2, and 3 this overhead way extends directly to the rear of the machine. It consists of a rod or bar supported at front and rear by arches 65 and 66, respectively. The arch 65 arises from the front corners of the main frame 1, while the arch 66 arises from the rear ends of the rearward extensions 2 of said frame 1, and said arches are of sufficient width and height to permit the stalks and shock to pass freely between them and support the elevated track or way 64 at a suitable distance above the top of the shock. Upon this elevated way travels a trolley 67, comprising a frame 68, suspended from a trolley-wheel 69, grooved to fit upon the way 64. The trolley-frame 68 has pivoted to it at 70 a lever 71, to the forward end of which the yoke 60 is pivotally connected. The lever 71 is provided with a grooved wheel 72, adapted to bear on the under side of the way 64 when the shock-support is lifted, and thereby maintain it at a sufficient elevation above the platform 30.

The apparatus thus organized operates in the following manner, it being understood that the shock-support is in position upon the rotary platform and that the trolley and lifting-yoke are disengaged therefrom and at the rear of the way or track, as shown in full lines in Fig. 2: As the machine advances the stalks are gathered by the gathering and conveying mechanism and severed by the cutting mechanism, being delivered over the front edge of the rotary shocking-platform. The machine, as illustrated, is organized to operate upon two rows of stalks at once. As the stalks are delivered the platform 30 rotates, carrying around with it the stalk-support 50 and the radial stalk-supporting arms, the butts of the stalks being delivered on the stalk-support and their upper ends being supported by the arms 33, the spaces between which are filled as the platform and arms rotate. When a sufficient quantity of the stalks have accumulated to form a shock, the machine is stopped and the shock is bound in any suitable manner. I prefer to employ in this connection two curved arms 73, pivotally supported from uprights 74 at the forward corners of the machine and having their rear ends detachably connected by means of a link 75 or other suitable means. These arms serve in an obvious manner to hold the stalks in position during the formation of the shock. After the shock has been formed the trolley is moved forward along the track and the lower ends of the yoke 60 are engaged with the edge of the shock-support 50. The ends of the arms 73 are previously disconnected, and these latter are swung laterally outward out of the way. Downward pressure on the rear end of the lever 71 then lifts the shock-support clear of the platform, and this elevated position may be maintained by engaging the roller 72 with the under side of the way 64. The trolley is then moved to the rear, carrying along with it the shock-support and shock, and this rearward travel will be facilitated by the fact that the frame 1 will tilt downward at the rear until the rear caster-wheels 49 come into contact with the ground, thus inclining the track or way and facilitating the rearward motion of the load. When the shock is suspended over the open space 3 at the rear of the frame, the two halves or sections of the shock-support may be disengaged, whereupon the shock will fall to the ground between them. It will be understood, of course, that as long as the hook projection 57 is in engagement with the loop or bar 54 the shock-support presents a rigid plane bearing-surface for the shock; but as soon as the hook is disengaged by turning the rock-shaft 55 by means of its handle 58 the two parts of the shock-support separate and swing downward and outward to permit the passage of the shock between them. The machine may then be driven forward, the shock-support restored to its position on the rotary platform, and the operation of the machine may then proceed as before.

I do not wish to be understood as limiting myself to the precise details of construction hereinbefore described, and shown in the drawings heretofore referred to. For instance, the particular cutting and gathering mechanism and the stock-supporting arms carried by the rotary platform are the forms of these mechanisms which I prefer, as they are my invention and form the subject-matter of an application heretofore filed by me December 30, 1901, Serial No. 87,654. I do not, however, claim these features specifically in the present application, as they are claimed in said prior application, and other mechanisms for this end may be substituted for them. Furthermore, the point of discharge of the shock may be varied, and in Figs. 9 and 10 I have shown a modified form of my invention, in which a way or track 76 is employed, which extends first rearward and then laterally outward, so as to deposit the shock at one side of the line of cut behind the wheel 77. In this construction the draft connection shown at 79 may be at one side of the cutting mechanism in front of the wheel 77. Other modifications will readily suggest themselves, and I therefore do not wish to be understood as limiting myself to the precise details of construction hereinbefore described, and shown in the accompanying drawings.

Having thus fully described my invention, what I claim as new, and desire to secure by Letters Patent, is—

1. In a corn-harvester, the combination of a shock-support, a frame provided with means for rotating said support, a track carried by said frame and extending from the support-rotating means to the point of discharge of the shock, and a trolley mounted to travel on said track and provided with means to engage and sustain said shock-support, substantially as described.

2. In a corn-harvester, the combination, with a frame provided with a rotary shocking-platform, of a shock-support removably mounted on said platform and rotating therewith, a track carried by said frame and extending from the rotary platform to the point of discharge of the shock, and a trolley mounted to travel on said track and provided with means to engage and sustain said shock-support, substantially as described.

3. In a corn-harvester, the combination, with a main frame, of cutting mechanism, a rotary shocking-platform located in the rear thereof, a plurality of stalk-supporting arms pivotally supported above said platform, means for locking said arms in radially-spaced positions relatively to the platform and to each other, the space between said arms and the platform being free and unobstructed, and said arms being free, when released, to swing independently in the direction of movement of the shock as it is being discharged, a shock-support removably mounted on said platform and rotating therewith, a track carried by the main frame and extending from the rotary platform to the point of discharge of the shock, and a trolley mounted to travel on said track and provided with means to engage and sustain said shock-support, substantially as described.

4. In a corn-harvester, the combination, with a main frame, of cutting mechanism, and a rotary shocking-platform located in the rear thereof, a shock-support removably mounted on said rotary platform, stalk gathering and conveying mechanism for delivering the stalks to said shock-support, a plurality of stalk-supporting arms pivotally supported above said platform and stalk-support, means for locking said arms in radially-spaced positions relatively to the platform and to each other, the space between said arms and platform being free and unobstructed, and said arms being free, when released, to swing independently in the direction of movement of the shock as it is being discharged, a track carried by the main frame and extending from the rotary table to the point of discharge of the the shock, and a trolley mounted to travel on said track and provided with means to engage and sustain said shock-support, substantially as described.

5. In a corn-harvester, the combination, with a main frame provided with a rotary platform, a track or way carried by said frame and extending from the rotary platform to the point of discharge of the shock, and a trolley mounted to travel on said track, of a shock-support pivotally suspended from said trolley and composed of separable sections provided with connecting devices for maintaining the sections in the same plane when united, substantially as described.

6. In a corn-harvester, the combination, with a main frame provided with a cutting mechanism, a rotary shocking-platform, an overhead track, and a trolley mounted to travel on said track, of a supporting-yoke suspended from said trolley, and a shock-support, the lower ends of said yoke and the shock-support being provided with detachable connecting devices, substantially as described.

7. In a corn-harvester, the combination, with a main frame provided with a cutting mechanism, a rotary shocking-platform an elevated track or way, and a trolley adapted to travel thereon, of a supporting-yoke suspended from said trolley, and a sectional shock-support provided with separable engaging devices to maintain the united sections in the same plane, the respective sections being pivotally and detachably connected to the lower ends of the supporting-yoke, substantially as described.

8. In a corn-harvester, the combination, with a main frame provided with a cutting mechanism, a rotary shocking-platform, and an overhead track, of a trolley adapted to travel thereon, a lever fulcrumed on the trolley, and a shock-support suspended from the lever, substantially as described.

9. In a corn-harvester, the combination, with a main frame provided with a cutting mechanism, a rotary shocking-platform, an overhead track, and a movable shock-support, of a trolley adapted to travel on said track, and comprising a frame and a trolley-wheel above the track, and a lever fulcrumed to the trolley-frame, connected with the shock-support on one side of the fulcrum, and provided on the other side of the fulcrum with a wheel to engage the under side of the track, substantially as described.

10. In a corn-harvester, the combination of a shock-support, a frame provided with means for rotating said support, a track carried by said frame and extending from the support-rotating means to the point of discharge of the shock, and a trolley mounted to travel on said track and provided with means for engaging and lifting said shock-support, substantially as described.

11. In a corn-harvester, the combination, with a tilting main frame provided with a track extending from front to rear thereof, of a rotary shocking-platform mounted at the front of the frame, a shock-support removably mounted on said platform and rotating therewith, and a trolley mounted to travel on said track and provided with means to engage and sustain said shock-support, substantially as described.

12. In a corn-harvester, the combination, with a main frame provided with cutting mechanism at the front thereof, of a rotary shocking-platform located in the rear of the cutting mechanism, a plurality of stalk-supporting arms pivotally supported above said platform, means for locking said arms in radially-spaced positions relatively to the platform and to each other, the space between said arms and the platform being free and unobstructed, and said arms being free, when released, to swing independently in the direction of the movement of the shock as it is being discharged, and curved arms pivotally supported at their forward ends, extending around to the rear of the shock, and having their free ends detachably connected, substantially as described.

In testimony whereof I affix my signature in presence of two witnesses.

SAMUEL C. ANDERSON.

Witnesses:
E. O. HAGAN,
IRVINE MILLER.